JULIA A. SHRECKENGAUST.
System of Laying Out Garments.

No. 129,603.        Patented July 16, 1872.

129,603

UNITED STATES PATENT OFFICE.

JULIA A. SHRECKENGAUST, OF CHILLICOTHE, OHIO.

IMPROVEMENT IN SYSTEMS OF LAYING OUT GARMENTS.

Specification forming part of Letters Patent No. 129,603, dated July 16, 1872.

I, JULIA A. SHRECKENGAUST, of the city of Chillicothe, county of Ross and State of Ohio, have invented an Improved System of Laying Out Garments, of which the following is a specification:

My invention relates to a simple and correct system, whereby a person of ordinary intelligence is enabled to measure and cut any garment in a few minutes, and in such a manner as to insure a perfect fit.

I use a square and set of scales. The square is of the customary form, with two cross-pieces so attached as to hold the temporary scales. The scales employed are the one-third of the breast-measure and one-third of the waist-measure, each divided into eighteen equal parts, and *"* se eighteen equal parts are divided in L.. ves, and range from a half to eighteen, and *"* numbered eight, (8½,) eight and a half, to *"* y. The number on each scale denotes that .. must be used in draughting a garment for a person whose breast and waist measure correspond; for example, if the breast measures twelve inches and the waist measures eight inches, then take scale No. 12 and place it in long arm of square and scale No. 8, and place it in short arm of square, with figure 1 on each scale lapping at the angle of the square.

Figure 1:
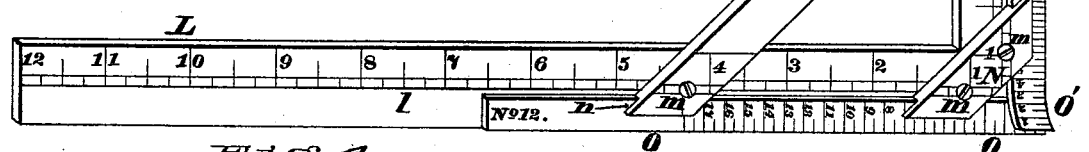
Figure 4:
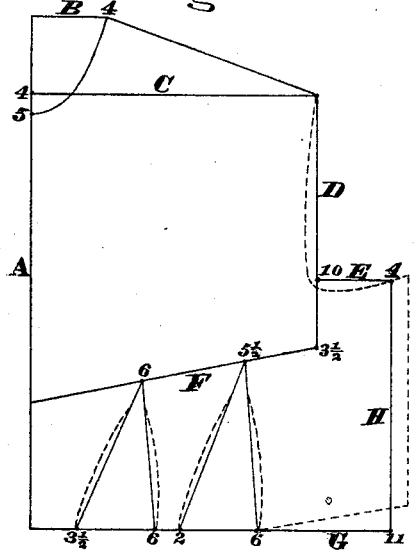
Figure 2:
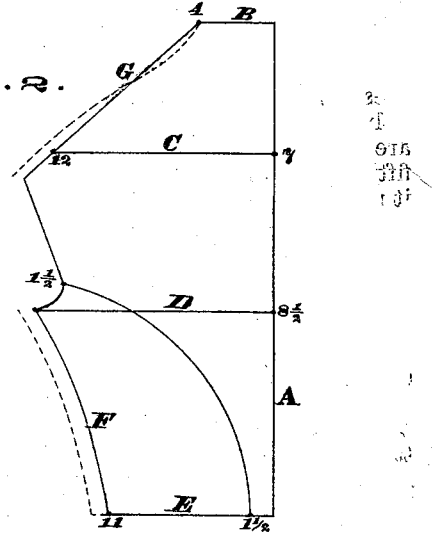
Figure 5:
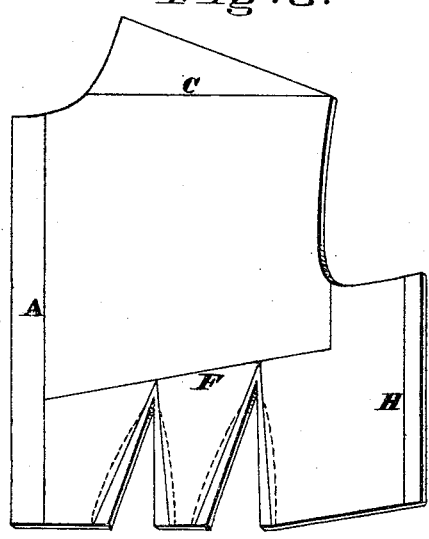
Figure 3:
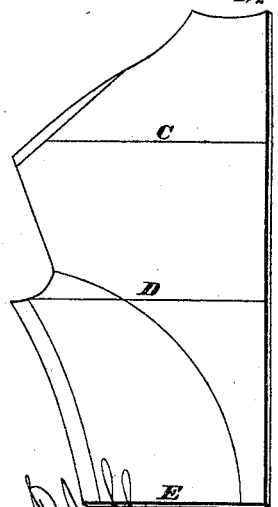

Figure 1 is a perspective view of my improved draughting-square with two of the detachable scales in position. Fig. 2 shows the method of draughting the back of the dress. Fig. 3 shows the back of a dress after being cut out of the goods. Fig. 4 shows the method of draughting the front part of a dress, and Fig. 5 represents the front part of a dress after being cut out of the goods.

Before proceeding to give directions for taking the necessary measures from a person, I will explain the construction of my improved draughting-square, which is arranged as follows:

L L' represent, respectively, the long and short arm of an ordinary square having scales of inches upon it, as shown at l l'. Extending diagonally from one arm to the other, and at an angle of forty-five degrees, are two bars or clips, N N', which are attached to the square by means of screws m. These bars or clips are notched at their ends, as at n, to receive the detachable scales previously alluded to. These scales O O' are maintained in position by being inserted between the notched ends of the bars and the flat sides of the draughting-square, as clearly shown in Fig. 1.

*Directions for Taking Measures from the Person.*

One, take the size of the breast close up under the arms by passing an inch tape around the breast above the bust. This measure must be taken tight—at least two inches tighter than most ladies like to wear their dresses, as the measure is taken over the dress. Second, size of waist-measure, taken tight around the small part of the waist. Third, again two inches higher up around the waist. Fourth, get the length of the waist, taken from the prominent neck-bone to the lower part of the waist. Fifth, get the width of the back by placing an inch tape under the right arm, at top of side seam, across shoulder-blades, to the same point under the left arm. Sixth, again across the back, but this time one and a half inch higher up than the previous measure, and extending only from the right-arm size across to the left-arm size. Seventh, length of side seam is to be taken close under the arm to the lower part of the waist. Eighth, to get the width of chest, place an inch tape on the center of left arm, about one and a half inch below where the arm joins the shoulder, pass a tape across the collar-bone to the same part on the right arm, care being taken to have the person stand perfectly erect. Ninth, measure from the center of neck-bone across the shoulder close up to the neck, and then down in front to the height of dart, then down to the lower part of the waist. Tenth, length of shoulder. Eleventh, size of neck; pass a tape around from top of collar-bone to center of neck-bone. Twelfth, size of arm-hole; measure around the arm where the sleeve is to be sewed in. Thirteenth, in measuring for the sleeve, the arm should first be bent a little more than the shape of a square, and the measure taken from the center of the back across the shoulder-blade to the elbow, and then from the elbow to the wrist; after this has been accomplished the arm is to be straightened, and the measure taken along the inside of the arm, from the wrist, close up under the arm to the arm-size of the waist. To get the length of a skirt take the measure in front, on hip, and at back.

Fig. 2 is the back of a dress.

*Directions for Draughting the Back.*

Suppose a child measures twelve inches around the breast, take No. 12 scale, put in long arm of square; and suppose the waist measures eight inches, then put No. 8 scale in short arm of square, with figure 1 on each scale lapping at the angle of the square. Fold the lining and place it on the table with the fold toward you for a closed habit at back, and reverse it for an open back; lay long arm on fold of cloth with fold toward you, with short arm near top of cloth. Before moving the square, draw line A, dot for length of waist, and before moving the square draw line B, then dot at No. 7, breast-scale, for line C; then move square down and let the corner of square rest at No. 7; then dot at No. 8½; then draw line C on short arm of square; then move square down, keeping long arm parallel with line A till corner of square rests at No. 8½; then draw line D; move square down to length of waist and draw line E. Before moving square, dot at No. 1½, waist-scale; move square to No. 1½ and dot at No. 11, waist-scale, as represented on diagram. Turn square with long arm on line B and dot at No. 4, breast-scale; then move square down on line C and dot at No. 12, breast-scale; then move square down parallel with line D. The width of back on line D is obtained by actual measurement, and should be very carefully taken. To get the length of shoulder, rest the long arm of square on line B at No. 4, and No. 12 on line C; now draw line G through dot at No. 12 and No. 4. This is actual measurement. Now take a cord the length of line D, holding one end of the cord in the left hand, and with the right hand hold the other end of the cord and also a pencil. Place the left hand at such a distance from line A toward the lower part of the waist as to bring the right hand, with cord and pencil, upon No. 1½ on line E; now draw the curve for the side body, from No. 1½ on line E to No. 1½ above line D, as represented on the diagram. Take a cord twice the length of line D, one and a half (1½) inch over, and draw line F in the same manner for side seam, the right hand with pencil resting on No. 11 on line E; then strike the curve line from No. 11 to dot on line D. Cut out by dotted lines, as represented on diagram.

Fig. 4, to get the fore part of a dress.

To get the line A and line B you must place the long arm of the square parallel with the edge of the cloth, and, allowing one and a half inch for making up, now draw line A near top of cloth down long arm of square 10½, and before moving square dot at No. 4 and No. 5, breast-scale; now move short arm parallel with line A, draw line B to No. 4 of breast-scale, move corner of square to No. 4 on line A, and draw line C, by the long arm, from line A, as represented on the diagram; now take back and let No. 4 of back rest on No. 4 of fore part, and let the end of shoulders rest on line C; dot for length of shoulder; now let the square rest at No. 4 on line B and on line C, and draw length of shoulder to dot; now move the short arm parallel with line C, and draw line D from line C by long arm of square, and before moving the square dot at No. 10, breast-scale; now move the square down to No. 10 and let the short arm rest at No. 10; dot at No. 3½ on line D. Pin No. 4 of back and No. 4 of fore part together; now take an inch tape, place on line B at center of back of neck, let it extend across No. 4 at neck, down front to height of dart; then dot down to length of waist at front for line G; now place short arm on line D, rest the corner of square at No. 10, and draw line E to No. 4, breast-scale; now place short arm of square on line A and let long arm rest on No. 3½ on line G; now draw line F through dot at height of dart to No. 3½ on line D. Before moving the square, dot at No. 6, breast-scale; now move corner of square to dot and dot at No. 5½, breast-scale. Place long arm of square parallel with line A and draw line G at length of waist. Before moving the square, dot at 3½, waist-scale; now move corner of square to No. 3½ and dot at No. 6; move corner of square to No. 6 and dot at No. 2; move square to No. 2 and dot at No. 6, and then to 6 and dot at No. 11, waist-scale; now let short arm rest at No. 10 and long arm rest at No. 4 on line E. Draw line H; now place corner of square at No. 3½ on line G, and draw line to height of dart; now place corner of square to No. 6 and draw a line from No. 6 to height of dart; now move square to No. 2 and draw line to No. 5½; now place corner of square to No. 6 and let long arm rest at No. 5½; now draw line for dart, and sew darts by dotted lines. Cut out arm-size and side seams by dotted lines. No. 4 on line B at back, and No. 5 on line A give the size of neck. From No. 5 on line A to line D is the width of the chest, which is obtained by actual measurement. The length of shoulder and length of back, and width of back and side seam, and from No. 1½ above line D to line A, are actual measurements, which are obtained by inches. Line C on back and line C on fore part give the height of shoulders. If it is desired to throw the shoulder-seams further back, dot at No. 11½, breast-scale, on line C at back, and fore part on line A, dot at No. 3½, breast-scale, for line C, and by so doing you can throw the shoulder-seam back.

With my improved system cloaks and all kinds of garments for ladies and children can be laid out so as to fit in the most perfect and graceful manner, and in the shortest possible time.

Claim.

I claim as my invention—

The system of laying out garments, substantially as herein illustrated and described.

In testimony of which invention I hereunto set my hand.

JULIA A. SHRECKENGAUST.

Attest:
G. H. KNIGHT,
E. K. MICK.